United States Patent Office 2,963,318
Patented Dec. 6, 1960

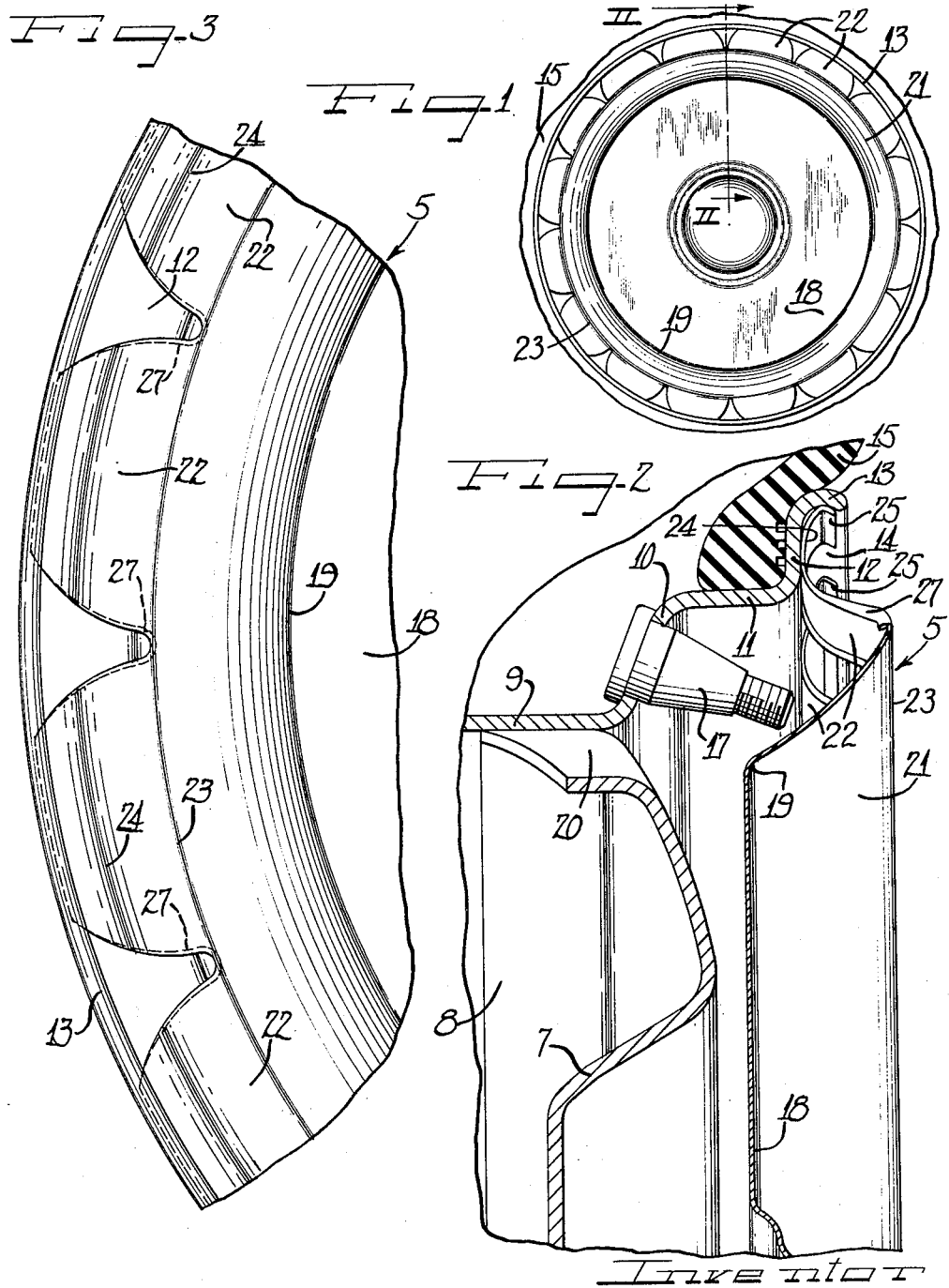

2,963,318

WHEEL COVER

George Albert Lyon, 13881 W. Chicago Blvd., Detroit 28, Mich.

Filed June 20, 1955, Ser. No. 516,538

5 Claims. (Cl. 301—37)

The present invention relates to improvements in wheel structures and more particularly concerns the ornamental and protective covering of the outer sides of vehicle wheels.

An important object of the present invention is to provide an improved wheel structure provided with novel cover means affording ready circulation of air through the wheel and the cover.

Another object of the invention is to provide an improved wheel cover for disposition at the outer side of a vehicle wheel and having novel retaining finger structure at the margin thereof for snap-on pry-off cooperative relation with the tire rim of the wheel.

A further object of the invention is to provide improved retaining finger means at the margin of a vehicle wheel cover for retaining engagement with the terminal flange of the tire rim of the wheel.

Other objects, features and advantages of the present invention will be readily apparent from the following detailed description of a preferred embodiment thereof taken in conjunction with the accompanying drawing, in which:

Figure 1 is a side elevational view of a wheel structure embodying the features of the invention;

Figure 2 is an enlarged fragmentary radial sectional view taken substantially on the line II—II of Figure 1; and Figure 3 is an enlarged fragmentary outer side elevational view of a marginal portion of the cover and the tire rim to which the cover is applied and showing in better detail certain features of the invention.

A cover 5 embodying features of the present invention is adapted to be applied to the outer side of a vehicle wheel which may be of the current disk spider drop center type having a disk spider wheel body 7 provided with an axially extending marginal attachment flange 8 by which the wheel body is secured in suitable fashion to a base flange 9 of a tire rim having at the outer side thereof generally axially outwardly facing and radially and axially outwardly sloping side flange 10 merging with an axially outwardly extending intermediate flange 11 that leads to a terminal flange having a generally radially outwardly extending portion 12 and a turned generally axially outwardly extending terminal lip portion 13 which provides a generally radially inwardly facing annular groove 14. A pneumatic tire 15 such as a tubeless tire or a tire and tube assembly is adapted to be carried by the tire rim. For inflating the tire a valve stem 17 is provided and which is carried by and extends through the side flange 10 in the customary manner.

According to the present invention the cover 5 is adapted to be made as a one piece sheet metal stamping drawn from suitable material such as stainless steel or brass and appropriately finished such as by polishing and burnishing and plating or the like. It comprises a circular body having a central portion 18 preferably dimensioned for substantially overlying the wheel body 7 in spaced relation. Joining the circular central portion 18 on a short radius annular reinforcing rib-like juncture 19 preferably of a diameter to lie opposite the inset portions of the wheel body flange 8 defining air circulation openings 20 through the wheel, is a generally radially and axially outwardly flaring annular marginal cover portion 21 for substantially overlying the outer side of the tire rim. For conveniently accommodating the valve stem 17, the marginal cover portion 21 preferably defines with the outer side of the tire rim flanges a substantial chamber. For substantial rigidity the annular marginal cover portion 21 is preferably of rib-like, large radius outwardly convex cross-section.

For retention of the cover 5 on the wheel, the annular cover margin 21 is provided with a series of marginal extension retaining fingers 22 which are preferably of substantial width, especially at their root or juncture portions with the marginal cover annular portion 21. Juncture of the fingers 22 with the cover portion 21 is preferably on a substantially rigid annular reinforcing rib-like ridge 23 from which the fingers recede generally radially outwardly and axially inwardly in a radially dished formation for bottoming at shoulders 24 thereof against the radially extending terminal flange portion 12 of the tire rim. From the shoulders 24 the terminal extremity portions of the fingers extend in curving relation generally radially outwardly and axially outwardly to reinforcing and tire rim flange engaging turned terminals 25 in the form of narrow stiff flanges angularly disposed relative to the body portions of the fingers and providing shoulders for resiliently tensioned thrusting gripping interengagement within the groove 14 provided by the tire rim terminal flange portion 13 and more particularly for interengagement behind the generally axially inwardly and radially inwardly facing shoulder provided at the axially outer side of the groove. It will be appreciated that initially the retaining finger terminals 25 extend to a larger diameter than the diameter at the inside of the terminal flange groove 14 so that when the fingers are in radially outward thrusting engagement with the terminal flange portion 13 the fingers will be placed under resilient inward bowed tension reacting radially outwardly.

In mounting the cover at the outer side of the wheel, the cover is generally centered over the wheel and then axially inwardly pressed so as to effect camming of the outwardly turned terminal portions of the retaining fingers 22 over and past the tip of the terminal flange portion 13 until the terminals 25 of the retaining fingers snap behind the terminal flange tip into the undercut groove 14. By virtue of the inward bowing and radially inward tensioning of the retaining fingers and the tendency to cam axially inwardly within the groove 14, the shoulder portions 24 of the fingers are pressed firmly against the terminal flange portion 12, whereby to support the cover in resilient floating relation upon the tire rim.

In order to cooperate with the stiffening ridge rib 23, and the both circumferentially and radially arcuate retaining finger shoulders 24, as well as the stiffening terminals 25 of the fingers, in affording resilient stiffness for the fingers, the fingers are preferably further reinforced at their sides and are connected together so that the adjacent fingers will mutually reinforce one another. To this end, the respective sides of the fingers are provided with inturned, preferably generally axially and radially inwardly directed narrow reinforcing flanges 27 which are connected together yoke-like at the roots of the adjacent fingers where they join the ridge 23. By having the reinforcing flanges 27 of maximum width at the juncture yoke portions thereof and of gradually diminishing width to approximately the bottoming shoulder portions 24 of the fingers, gradually diminishing resilient stiffness is afforded in the fingers from their root portions toward the tips. This is advantageous in facilitating resilient deflectional yielding of the fingers for snapping into engagement with the terminal flange portion 13 and also for pry-off purposes.

Additional resiliency increasing advantage is gained by having the sides of the fingers formed on laterally outward radius converging gradually toward maximum convergent relation at the retaining terminal extremities of the fingers.

By the described construction of the fingers, and more particularly the construction of the sides of the fingers 22, an advantageous arrangement of the openings between fingers is attained for air circulation through the fingers. This affords the widest portions of the openings adjacent the radially outermost portion of the tire rim at the terminal flange thereof. Since the radially inner portions of the retaining fingers 22 face generally radially outwardly, the innermost and narrowest portions of the wheel openings are nevertheless affectively disposed for air circulation in the rotation of the wheel in service. Such air circulation may occur freely within the chamber behind the cover portion 21 and through the wheel openings 20.

In removing the cover from the wheel, the generally wedge shaped openings between the retaining fingers afford ready access for a pry-off tool in behind the outer marginal portion of the cover 21 for engagement either behind the inner yoke portions of the reinforcing flanges 27 or behind the generally axially inwardly directed reinforcing rib 19 of the cover thus serving as a pry-off rib so as to release and snap out of engagement with the terminal flange portion 13 the adjacent retaining fingers. As will be observed in Fig. 2, the pry-off rib 19 is located substantially radially and axially inwardly relative to the bottoming shoulder portions 24 of the retaining fingers and is spaced by the cover portion 21 a substantial distance axially inwardly relative to the reinforcing flange 27. It may be necessary of course to affect pry-off leverage at a plurality of spaced points to release several of the plurality of retaining fingers 22 before the cover will come off of the wheel.

It will be understood that modifications and variations may be effected without departing from the scope of the novel concept of the present invention.

I claim as my invention:

1. In a wheel structure including a wheel body and a tire rim, with a turned terminal flange on the tire rim, a cover for disposition at the outer side of the wheel including a circular body having a generally radially and axially outwardly extending marginal portion provided with a series of generally radially outwardly and axially inwardly extending radially dished retaining fingers having terminals thereon engageable in resilient tensioned radially outwardly thrusting relation with the terminal flange, said retaining fingers having radially inner portions projecting generally axially outwardly relative to the tire rim and provided with reinforcing inturned side flanges thereon for increasing the resilient resistance of the fingers to radial deflection.

2. In a cover for disposition at the outer side of a vehicle wheel, a circular cover member having a generally radially and axially outwardly directed annular marginal portion provided with generally radially outwardly and axially inwardly projecting and radially dished retaining fingers having generally radially turned terminal portions axially outwardly and engageable with a flange on a tire rim, said fingers having therebetween generally wedge shaped openings and said openings being defined by inturned reinforcing flanges on the sides of the fingers and connected together adjacent the roots of the adjacent fingers and affording resilient stiffness in the fingers resisting deflection thereof.

3. In a wheel structure including a tire rim having an annular generally radially inwardly facing flange portion, a cover for disposition at the outer side of the wheel including a generally circular cover member having a marginal portion provided with generally radially outwardly projecting retaining fingers having resiliently flexible terminal end portions engageable in resilient tensioned retaining relation with said radially inwardly facing rim flange, said fingers having at the sides thereof turned reinforcing flanges for increasing the resilient stiffness of the fingers radially inwardly from said terminal end portions to enhance the tensioning and thereby the retaining engagement thereof with said rim flange, said reinforcing flanges terminating a substantial distance radially inwardly from the terminals of said terminal end portions so that said terminal end portions are of substantially greater flexibility than the remaining portions of the fingers.

4. In a cover for disposition over the outer side of a vehicle wheel having a generally radially inwardly facing flange and a generally axially outwardly facing flange immediately radially and axially inwardly therefrom, a generally circular body having a marginal generally radially and axially outwardly projecting portion from which extend generally radially outwardly and axially inwardly divergently relative thereto a circumferentially spaced series of axially inwardly arched resilient cover retaining fingers, said fingers having terminals engageable under resilient tension with a radially inwardly facing wheel flange portion and adjacent to said terminals axially inwardly facing shoulders engageable against an axially outwardly facing wheel flange portion, said fingers joining said cover marginal portion on a reinforcing axially outwardly projecting rib ridge and having axially inwardly turned reinforcing flanges on the sides thereof gradually diminishing in width to said finger shoulders whereby not only are said finger shoulders free to bottom against an axially outwardly facing rim flange but the finger shoulder and terminal portions are relatively more flexible than the portions of the fingers between said finger shoulders and said rib ridge.

5. In a cover for disposition over the outer side of a vehicle wheel having a generally radially inwardly facing flange and a generally axially outwardly facing flange immediately radially and axially inwardly therefrom, a generally circular cover body having a marginal generally radially and axially outwardly projecting portion from which extend generally radially outwardly and axially inwardy divergently relative thereto a circumferentially spaced series of axially inwardly arched resilient cover retaining fingers, said fingers having terminals engageable under resilient tension with a radially inwardly facing wheel flange portion and adjacent to said terminals axially inwardly facing shoulders engageable against an axially outwardly facing wheel flange portion, said cover body having at juncture with said marginal portion a pry-off rib which projects generally axially inwardly and is substantially spaced axially and radially inwardly relative to said finger shoulders and which pry-off rib is accessible through the spaces between said fingers by means of a pry-off tool.

References Cited in the file of this patent

UNITED STATES PATENTS

| 2,083,066 | Hunt | June 8, 1937 |
| 2,329,945 | Schatzman | Sept. 21, 1943 |
| 2,404,390 | Lyon | July 23, 1946 |
| 2,421,755 | Lyon | June 10, 1947 |
| 2,624,627 | Lyon | Jan. 6, 1953 |
| 2,624,628 | Lyon | Jan. 6, 1953 |

FOREIGN PATENTS

| 487,154 | Canada | Oct. 14, 1952 |
| 494,977 | Canada | Aug. 4, 1953 |
| 509,850 | Canada | Feb. 8, 1955 |